United States Patent [19]
Grover

[11] 3,744,640
[45] July 10, 1973

[54] LABORATORY INTAKE FILTER
[75] Inventor: Douglas U. Grover, College Park, Ga.
[73] Assignee: Glasrock Products, Inc., Atlanta, Ga.
[22] Filed: Nov. 17, 1971
[21] Appl. No.: 199,446

[52] U.S. Cl. .............................. 210/463, 210/172
[51] Int. Cl. ............................................. B01d 35/00
[58] Field of Search ................... 210/172, 438, 448, 210/449, 459, 460, 463

[56] References Cited
UNITED STATES PATENTS

| | | | |
|---|---|---|---|
| 2,788,125 | 4/1957 | Webb | 210/460 X |
| 2,905,327 | 9/1959 | Phillips | 210/463 |
| 2,923,411 | 2/1960 | Oster | 210/460 X |
| 3,123,456 | 3/1964 | Boltz et al. | 210/460 X |
| 3,301,402 | 1/1967 | Falkenberg et al. | 210/460 X |
| 3,696,033 | 10/1972 | De Fano et al. | 210/460 |
| 3,160,588 | 12/1964 | Alarie | 210/463 X |

Primary Examiner—Samih N. Zaharna
Assistant Examiner—Richard W. Burks
Attorney—Douglas M. Clarkson, Richard L. Aitken et al.

[57] ABSTRACT

Intake filter device for use in laboratory liquid reagent bottles. The filter device includes a porous plastic filter element having a central cavity formed from a central bore which is closed at one end and a second bore with a diameter larger and shorter than the diameter of the first bore to receive a tubular glass insert. The tubular glass insert functions to anchor the filter element and prevent filtration through the entire surface of the porous filter element in contact with the liquid reagent.

14 Claims, 4 Drawing Figures

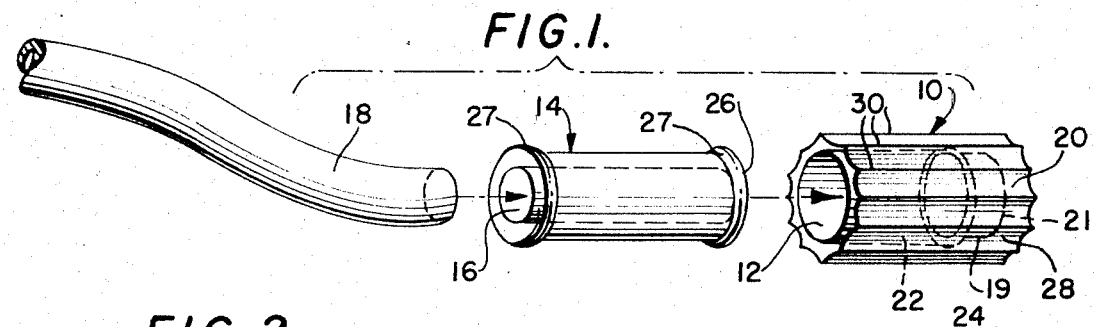
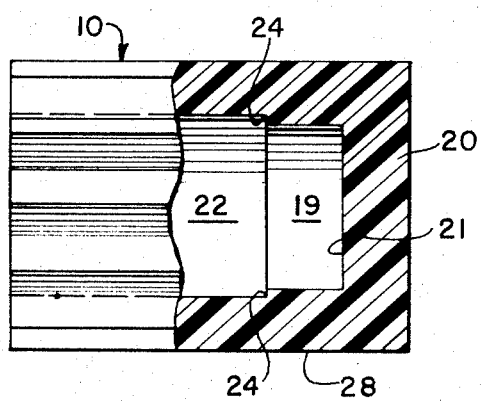
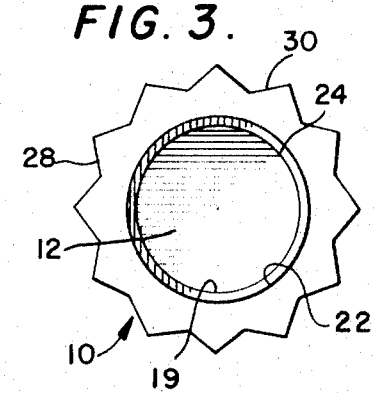
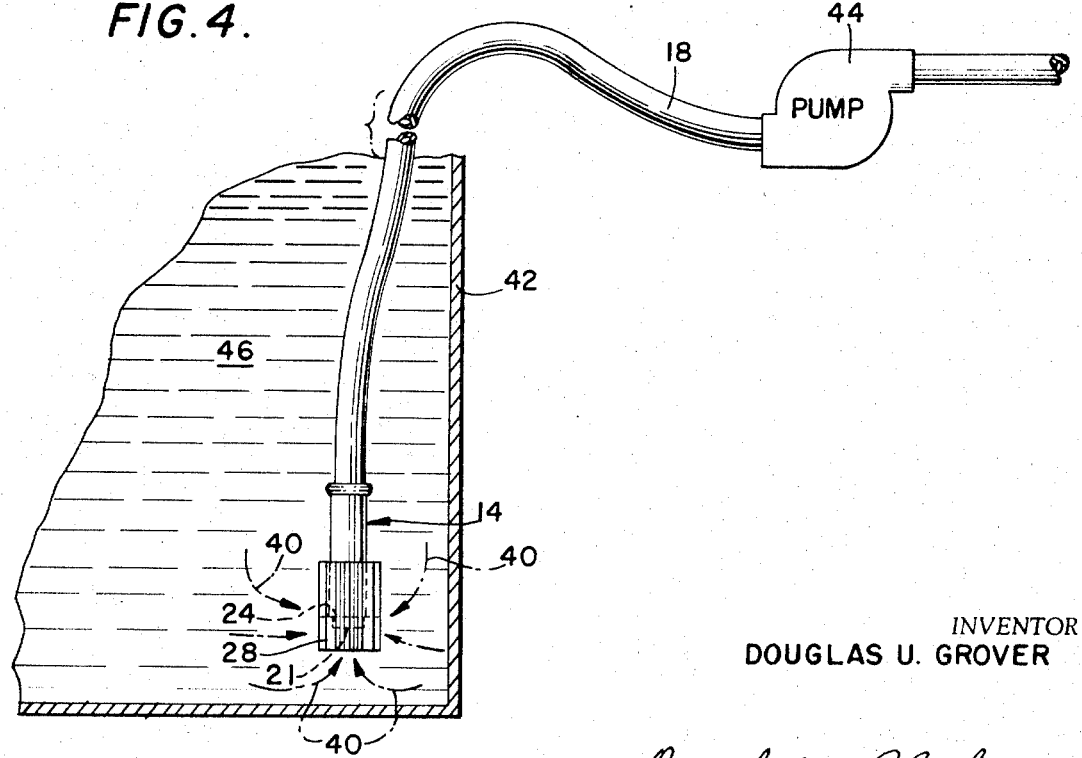
INVENTOR
DOUGLAS U. GROVER
BY Douglas M. Clarkson
ATTORNEY

LABORATORY INTAKE FILTER

BACKGROUND OF THE INVENTION

The field of this invention is a filter device for use on the intake line of a laboratory reagent pump. Such devices are immersed into a laboratory reagent bottle containing a liquid for filtering the reagent delivered from the bottle.

In many laboratory operations where debris would restrict the reagent flow or contaminate the sample it is desirable to remove such debris from the reagent before it enters the intake line of a laboratory pump. This problem is particularly acute in connection with the use of automated clinical testing machines which operate with a slow flow rate in the order of 1 cc. per minute. With such flow rates the presence of a slight amount of debris in the intake line will significantly slow down or even stop the flow of the reagent. An example of such an automated clinical testing machine is the Technicon Auto Analyzer.

Fritted glass and porous ceramic filters have been used in the past in similar applications; however, the disadvantages of utilizing such filters are that they are relatively expensive and susceptible to breakage.

SUMMARY OF THE INVENTION

The disadvantages of the prior art filter devices are significantly overcome by the present invention which is a device in the form of a porous plastic filter element with an elongated body having a central axial bore closed at one end and counterbored to a diameter slightly smaller than the outside diameter of a tubular glass insert which is inserted into the filter element. The tubular glass insert serves to anchor the filter element to retain it at the bottom of the reagent bottle, as well as prevent filtration through the portion of the walls of the filter body in contact with the tubular glass insert.

Accordingly, it is an object of the present invention to provide a small inexpensive plastic filter element suitable for use with laboratory pumps which operate at a slow flow rate.

It is a further object of this invention to provide such a device having a relatively large effective filtering surface.

It is another object of this invention to provide a filter device which is resistant to clogging of the filter pores.

It is yet another object of this invention to provide a filter device that is durable with prolonged usage.

BRIEF DESCRIPTION OF THE DRAWINGS

FIG. 1 is an exploded perspective view of a pump intake conduit, the tubular glass insert, and the plastic filter element;

FIG. 2 is an enlarged side elevation view of the plastic filter element of FIG. 1;

FIG. 3 is an end view of the filter element of FIG. 2; and

FIG. 4 is a partial perspective diagrammatic view of the filter device of this invention immersed in a liquid and connected to a pump.

DESCRIPTION OF THE PREFERRED EMBODIMENTS

The assembly of the various elements of the filter device of this invention is shown in FIG. 1. The filter element, generally designated by the numeral 10 is provided with an opening 12 of a diameter large enough to receive a tubular glass insert 14 which in turn has an opening 16 that receives a conduit 18 which is connected to the intake side of a reagent pump. Conduit 18 is preferably formed of an inert flexible material such as plastic tubing. The porous plastic filter element 10 is provided with a central axial bore 19 which terminates at a point 21 adjacent to closed end 20. A counterbore 22 is extended to a point short of point 21 so that it forms a circumferential shoulder 24 against which end 26 of the tubular glass insert 14 abuts upon insertion. The counterbore 22 extends to a point short of the closed end 20 to provide the filter element with a central cavity of two differing diameters. The tubular glass insert 14 may be inserted as far as the step or shoulder 24 formed at the junction of the two bores, and no further. The result is to increase the effective filtering area so that the effective filtering surface includes both the surface of closed end 20 in contact with the reagent and the portion of outer longitudinal surface 28 in contact with the reagent up to the point where the glass tube has been inserted. Or, stated another way, no filtering occurs through the portion of outer longitudinal surface 28 that is adjacent to tubular glass insert 14.

The outer longitudinal surface 28 of the plastic filter element 10 is provided with a plurality of raised ribs 30 which serve to increase the effective filter area. The ribbed surface also provides a means whereby the filter element 10 can be securely gripped for insertion of the tubular glass insert 14. In practice, it has also been noted that the ribbed surface configuration serves to prevent clogging of the filter because the debris separated from the filtered reagent does not readily adhere to the sharp apexes of the ribs.

The flow of reagent into the filter device of the present invention is shown schematically in FIG. 4 by arrows 40. In FIG. 4 the filter device comprising filter element 10, tubular glass insert 14 and conduit 18 is shown immersed in a liquid reagent bottle 42 with conduit 18 being connected to a pump 44.

As is shown in FIG. 4, when pump 44 is in operation with insert 14 resting on shoulder 24, the reagent enters conduit 18 only through that portion of the surface of the plastic filter element 10 which extends between shoulder 24 and closed end 20. No filtration occurs through the porous walls of the remainder of the filter body because of the impervious nature of the glass insert 14.

The outer diameter of the tubular glass insert 14 may be slightly larger than the inside diameter of bore 22. Thus, when the glass tube is inserted into the bore 22, it is held therein by frictional forces to form a tight seal. Alternately, end 26 of the insert 14 may be provided with a raised collar with an outside diameter slightly larger than the inside diameter of bore 22 to enable a friction fit when insert 14 is placed in bore 22.

As is shown in FIG. 1, a raised collar 27 for enabling a friction fit may be provided on both ends of insert 14. With this arrangement, either end of insert 14 may be inserted into bore 22 of filter element 10 and thus simplify assembly.

Conduit 18 is maintained with opening 16 of insert 14 by a friction fit. Thus, the outside diameter of conduit 18 is slightly larger than the inside diameter of opening 16 in insert 14.

FIG. 2 shows an enlarged partially cut away view of the porous plastic filter element 10 of this invention showing the shoulder 24 formed by the intersection of the larger diameter bore 22 with the smaller diameter bore 19. The shoulder 24 serves as a stop for the glass tube upon insertion.

An embodiment of the filter element 10 of this invention was formed from porous polyethylene with a standard porosity which was made from 150 mesh polyethylene granules which, when poured into an appropriate mold, left voids representing approximately 40 percent of the mold volume. The polyethylene granules were then heated to fusion and the pore size checked by mercury intrusion.

The resulting porous polyethylene is a solid material which is substantially uniform throughout and contains a small amount of porosity that is compatible with the particles to be removed from reagents.

The porous filter may be prepared from other suitable granular plastic materials commonly used in the manufacture of filter elements which when heated to fusion leave voids. Thus, the preparation of the porous plastic material forms no part of the instant invention. The size of the pores and the degree of porosity also forms no part of the invention since such factors are controlled by the characteristics of the reagent to be filtered. In this regard, determination and control of proper pore size and degree of porosity are factors which are within the skill of those in this art.

The device is disposable and is intended to function between 8 and 48 hours of operating time. It may, however, be backflushed with the water and used a limited number of times, depending on the reagent used and the operator's skill.

It is understood that the embodiment described may be modified by changing the surface configuration. For example, the longitudinal ribs of the embodiment described above could be replaced by circumferential ribs. Other modifications will be apparent to those skilled in the art, and obvious and equivalent changes are intended to be included within the scope of this invention.

I claim:

1. A filter device comprising a filter element in the form of an elongated body completely formed of a porous plastic material, said elongated body being defined by wall means and first and second ends, said elongated body having a central axial cavity, circular in cross-sections throughout its length, formed therein which is open at said first end and closed by said second end, said cavity extending axially within said elongated body parallel with said wall means, said wall means being stepped so that the diameters of circular cross-sections taken at the region of the cavity near said closed end are smaller than diameters of circular cross-sections taken at the region of the cavity near said open end, said stepped wall means forming a circumferential shoulder within said elongated body against which a tubular insert can rest, a tubular insert defining a central passageway communicating with said cavity so as to allow fluid flow from said cavity through said passageway, said insert when inserted into said cavity being capable of resting on said shoulder and being capable of contacting the inside area of said wall means extending from said shoulder to said first end, said tubular insert providing a means for anchoring the filter device in a liquid reagent supply reservoir and preventing filtration through the volume of the porous plastic material of said elongated body extending from said first end to said circumferential shoulder.

2. The device as set forth in claim 1 also including a conduit communicating with the passageway in said insert, said conduit when connected to a pump providing a means for flowing a liquid from the outside of the filter device through the volume of the porous plastic material of said elongated body extending between said circumferential shoulder to said closed end of said filter element into said cavity of said filter element.

3. The device as set forth in claim 1 wherein said tubular insert is formed of glass.

4. The device as set forth in claim 3 wherein said tubular insert has an outside diameter slightly larger than the diameter of the portion of said cavity between said shoulder and said open end so as to enable a friction fit between said insert and said filter element.

5. The device as set forth in claim 3 wherein said tubular insert has a raised collar, the outside diameter of said raised collar being slightly larger than the larger diameter of the portion of said cavity between said shoulder and said open end so as to enable a friction fit between said insert and said filter element.

6. The device as set forth in claim 1 wherein said filter element has the general shape of a cylinder.

7. The device as set forth in claim 6 wherein the portion of said wall means which would contact a reagent to be filtered has a ribbed configuration.

8. The device as set forth in claim 7 wherein said filter element is formed of porous polyethylene.

9. The device as set forth in claim 8 wherein said porous polyethylene has voids representing approximately 40 percent of the volume of said filter element.

10. A filter element in the form of an elongated body completely formed of a porous plastic material, said elongated body being defined by wall means and first and second ends, said elongated body having a central axial cavity, circular in cross-sections throughout its length, formed therein which is open at said first end and closed by said second end, said cavity extending axially within said elongated body parallel with said wall means, said wall means being stepped so that the diameters of circular cross-sections taken at the region of the cavity near said closed end are smaller than diameters of circular cross-sections taken at the region of the cavity near said open end, said stepped wall means forming a circumferential shoulder within said elongated body against which a tubular insert can rest.

11. The filter element as set forth in claim 10 wherein said filter element has the general shape of a cylinder.

12. The filter element as set forth in claim 11 wherein the portion of said wall means which would contact a reagent to be filtered has a ribbed configuration.

13. The filter element as set forth in claim 12 wherein said filter element is formed of porous polyethylene.

14. The filter element as set forth in claim 13 wherein said porous polyethylene has voids representing approximately 40 percent of the volume of said filter element.

* * * * *